United States Patent [19]
Christie et al.

[11] Patent Number: 6,115,380
[45] Date of Patent: Sep. 5, 2000

[54] BROADBAND TELECOMMUNICATIONS SYSTEM

[75] Inventors: Joseph Michael Christie, deceased, late of San Bruno, Calif.; by Joseph S. Christie, legal representative; by Jean M. Christie, legal representative, both of Mt. Pleasant, Pa.; Michael Joseph Gardner, Overland Park, Kans.; Albert Daniel DuRee, Independence, Mo.; William Lyle Wiley, Olathe, Kans.

[73] Assignee: Sprint Communications Co., L.P., Kansas City, Mo.

[21] Appl. No.: 08/754,849

[22] Filed: Nov. 22, 1996

(Under 37 CFR 1.47)

[51] Int. Cl.[7] .............................. H04C 12/56; H04J 3/12
[52] U.S. Cl. ..................... 370/395; 370/410; 370/524; 370/270; 379/93.02; 379/114; 379/201; 379/230
[58] Field of Search ...................... 370/384, 385, 370/392, 395–397, 409, 410, 419, 420, 522, 524, 426, 264, 270; 379/88.22, 88.2, 88.25, 88.26, 90.01, 91.01, 93.02, 114, 115, 201, 202, 203, 34, 207, 220, 229, 230, 165

[56] References Cited

U.S. PATENT DOCUMENTS

| | | |
|---|---|---|
| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,985,849 | 1/1991 | Frankish et al. . |
| 4,991,204 | 2/1991 | Yamamoto et al. . |
| 4,993,104 | 2/1991 | Gordon . |
| 5,003,584 | 3/1991 | Benyacar . |
| 5,018,191 | 5/1991 | Catron et al. . |
| 5,048,081 | 9/1991 | Gavaras . |
| 5,058,104 | 10/1991 | Yonehara et al. . |

(List continued on next page.)

FOREIGN PATENT DOCUMENTS

| | | |
|---|---|---|
| 90312739 | 7/1991 | European Pat. Off. . |
| 91303312 | 10/1991 | European Pat. Off. . |
| 91311342 | 7/1992 | European Pat. Off. . |
| 92307752 | 9/1993 | European Pat. Off. . |
| 195 34 754 C1 | 11/1996 | Germany . |
| 870284896 | 5/1989 | Japan . |
| 07050057 | 9/1996 | Japan . |
| WO94/06251 | 3/1994 | WIPO . |
| WO95/04436 | 2/1995 | WIPO . |

OTHER PUBLICATIONS

McKinney, R. S., "ATM for Narrowband Services", IEEE Communications Magazine, IEEE (New York, US), vol. 32, (No. 4), p. 9, (Apr. 13, 1994).

(List continued on next page.)

*Primary Examiner*—Seema S. Rao
*Attorney, Agent, or Firm*—Harley R. Ball

[57] ABSTRACT

The invention is a system for providing virtual connections through an ATM interworking multiplexer on a call-by-call basis. A signaling processor receives signaling for a call and selects the virtual connection for the call. The signaling processor generates control messages that identify the selection and transfers the control messages to the ATM interworking multiplexer that accepted the access connection for the call. The multiplexer converts user information from the access connection into ATM cells for transmission over the virtual connection in accord with the control messages.

78 Claims, 3 Drawing Sheets

U.S. PATENT DOCUMENTS

| | | |
|---|---|---|
| 5,067,123 | 11/1991 | Hyodo et al. . |
| 5,084,867 | 1/1992 | Tachibana et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,185,743 | 2/1993 | Murayama. . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyj et al. . |
| 5,233,607 | 8/1993 | Barwig et al. . |
| 5,239,539 | 8/1993 | Uchida et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,995 | 12/1993 | Topper . |
| 5,271,010 | 12/1993 | Miyake . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,291,479 | 3/1994 | Vaziri et al. . |
| 5,306,318 | 4/1994 | Bachhuber et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,327,433 | 7/1994 | Hall . |
| 5,329,308 | 7/1994 | Binns et al. . |
| 5,339,318 | 8/1994 | Tanaka . |
| 5,345,443 | 9/1994 | D'Ambrogio et al. . |
| 5,345,445 | 9/1994 | Hiller . |
| 5,345,446 | 9/1994 | Hiller . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio . |
| 5,377,186 | 12/1994 | Wegner . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | La Porta et al. ......................... 370/385 |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha . |
| 5,463,620 | 10/1995 | Sriram . |
| 5,463,621 | 10/1995 | Suzuki . |
| 5,473,677 | 12/1995 | D'Amato . |
| 5,473,679 | 12/1995 | LaPorta . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,495,484 | 2/1996 | Self et al. . |
| 5,504,742 | 4/1996 | Kakuma et al. . |
| 5,506,844 | 4/1996 | Rao . |
| 5,509,010 | 4/1996 | LaPorta . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi . |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock . |
| 5,627,836 | 5/1997 | Conoscenti et al. . |
| 5,629,930 | 5/1997 | Beshai et al. . |
| 5,635,980 | 6/1997 | Lin et al. . |
| 5,636,210 | 6/1997 | Agrawal et al. . |
| 5,640,446 | 6/1997 | Everett et al. . |
| 5,661,725 | 8/1997 | Buck . |
| 5,666,349 | 9/1997 | Petri ......................................... 370/360 |
| 5,673,262 | 9/1997 | Shimizu . |
| 5,680,390 | 10/1997 | Robrock . |
| 5,703,876 | 12/1997 | Christie . |
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |

OTHER PUBLICATIONS

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9, (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research Exchange, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8.–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S. Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "RACE 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324.

N/A, "ANSI–TI.111–1992, Signaling System No. 7 (SS7)—Message Transfer Part (MTP)," American National Standard for Telecommunications.

N/A, "ANSI–TI.112–1992, Signaling System No. 7 (SS7)—Signaling Connection Control Part (SCCP)," American National Standard for Telecommunications.

N/A, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecommunicazoni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," TEKELEC, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc./Stevens Institute of Tecnology/Bell Comm. Research (Bellcore), p. 1–2, 5–6, and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband/Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec.17, 1993).

N/A, Q–2931 Overview, ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1,2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, and H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendation on Telephone Switching and Signalling—Intelligent Network/Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as Flexible Trunking Method," ATM_Forum/95–1157, ATM Forum Technical Committee, (Oct. 2–6, 1995).

Dualt, Maurice, "Proposal for ATM Trunking Options," ATM_Forum/95–1230, ATM Forum Technical Committee, (Oct. 2–6, 1995).

Okutani, Takenori, et al., "VTOA: Reference Configuration—ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunications Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modificaitons for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

BROADBAND TELECOMMUNICATIONS SYSTEM

RELATED APPLICATIONS

Not applicable

FEDERALLY SPONSERED RESEARCH OR DEVELOPMENT

Not applicable

MICROFICHE APPENDIX

Not applicable

BACKGROUND OF THE INVENTION

1. Field of the Invention

The invention relates to broadband systems, and in particular, to broadband systems that utilize narrowband circuit switches for various call capabilities.

2. Background of the Prior Art

Conventional circuit switches provide the backbone for many current telecommunications networks. These switches process call signaling and extend the call connection towards the destination. They have also been developed to include sophisticated capabilities. Examples include caller validation, number screening, routing, connection control, and billing. These switches are also used to deploy various services. Examples include calling cards, "800" calling, voice messaging, and class services.

At present, Asynchronous Transfer Mode (ATM technology is being developed to provide broadband switching capability for telecommunications calls, which are requests for telecommunications services. Some ATM systems have used ATM cross-connects to provide virtual connections, but cross-connect devices do not have the capacity to process signaling used by telecommunications networks to set-up and tear down calls. Thus, ATM cross-connects cannot make connections on a call-by-call basis. As a result, connections through cross-connect systems must be pre-provisioned which creates a relatively rigid switching fabric. Due to this limitation, ATM cross-connect systems have been used primarily to provide dedicated connections, such as permanent virtual circuits (PVCs) and permanent virtual paths (PVPs). But, they do not provide ATM switching on a call by call basis as required to provide switched virtual circuits (SVCs) or switched virtual paths (SVPs). Those skilled in the art are well aware of the efficiencies created by using SVPs and SVCs as opposed to PVCs and PVPs because SVCs and SVPs utilize bandwidth more efficiently.

ATM switches have also been used to provide PVCs and PVPs. Because PVCs and PVPs are not established on a call-by-call basis, the ATM switch does not need to use its call processing or signaling capacity. ATM switches require both signaling capability and call processing capability to provide SVCs and SVPs. In order to achieve virtual connection switching on a call by call basis, ATM switches are being developed that can process calls in response to signaling to provide virtual connections for each call. These systems cause problems, however, because they must be very sophisticated to support current networks. These ATM switches must process high volumes of calls and transition legacy services from existing networks. An example would be an ATM switch that can handle large numbers of POTS, 800, and VPN calls.

Currently, ATM multiplexers are capable of interworking traffic of other formats into the ATM format. These are known as ATM interworking multiplexers (muxes). ATM multiplexers are being developed that can interwork traffic into ATM cells and multiplex the cells for transport over an ATM network. These ATM mux are not used to implement virtual connections selected on a call-by-call basis.

Unfortunately, there is a need for efficient systems that can integrate the capabilities of broadband components with the capabilities of conventional circuit switches. Such a system would provide ATM virtual connections on a call-by-call basis, but support the numerous services currently provided by circuit switches.

SUMMARY

The present invention includes a telecommunications system and method for providing a service for a call. The invention operates as follows. A signaling processor receives and processes a first telecommunications signaling message for the call to provide a first control message, a second control message, and a second telecommunications signaling message. A first ATM interworking multiplexer receives narrowband traffic for the call over a first narrowband connection. It converts the narrowband traffic from the first narrowband connection into ATM cells that identify a first virtual connection based on the first control message and transmits the ATM cells over the first virtual connection. An ATM cross-connect system receives the ATM cells from the first ATM interworking multiplexer over the first virtual connection and routes the ATM cells from the first virtual connection based on the first virtual connection identified in the ATM cells. A second ATM interworking multiplexer receives the ATM cells from the ATM cross-connect system over the first virtual connection. It converts the ATM cells from the first virtual connection into the narrowband traffic and transmits the narrowband traffic over a second narrowband connection based on the second control message. A narrowband switch receives the narrowband traffic from the second ATM multiplexer over the second narrowband connection and provides a service to the call based on the second telecommunications signaling message. In various embodiments, the service provided by the narrowband switch is: routing the call, billing the call, validating the call, a calling card service, or a voice messaging service.

In various embodiments, the signaling processor selects the narrowband switch. The selection can be based on: available access to the narrowband switch, loading on the narrowband switch, an area served by the narrowband switch, network maintenance conditions, or the first telecommunications signaling message (including a destination point code, an origination point code, an NPA, an NPA-NXX, a caller's number, an "800", "888", or "900" number, or a network identifier in the message).

In various embodiments, the signaling processor selects the first virtual connection based on: the selected narrowband switch, available access to the narrowband switch, loading on the narrowband switch, an area served by the narrowband switch, network maintenance conditions, or the first telecommunications signaling message (including a destination point code, an origination point code, an NPA, an NPA-NXX, a caller's number, an "800", "888", or "900" number, or a network identifier in the message).

In various embodiments, the narrowband switch processes the call based on the second telecommunications signaling message. It provide a third telecommunications signaling message based on the call processing and routes the narrowband traffic for the call to the second ATM multiplexer over a third narrowband connection. The signaling processor receives and processes the third telecommunications signaling message to provide a third control message to the second ATM multiplexer, and to provide a fourth control message. The second ATM interworking multiplexer receives the narrowband traffic for the call from the narrowband switch over the third narrowband connection. It converts the narrowband traffic from the third narrowband connection into ATM cells that identify a second virtual connection based on the third control message and transmits the ATM cells over the second virtual connection. The ATM cross-connect system receives the ATM cells from the second ATM interworking multiplexer over the second virtual connection and routes the ATM cells from the second virtual connection based on the second virtual connection identified in the ATM cells. A third ATM interworking multiplexer receives the ATM cells from the ATM cross-connect system over the second virtual connection. It converts the ATM cells from the second virtual connection into the narrowband traffic and transmits the narrowband traffic over a fourth narrowband connection based on the fourth control message. In various of these embodiments, the signaling processor selects the second virtual connection based on a destination point code in the third telecommunications signaling message or based on a destination network identified in the third telecommunications signaling message.

DETAILED DESCRIPTION

Figure 1:
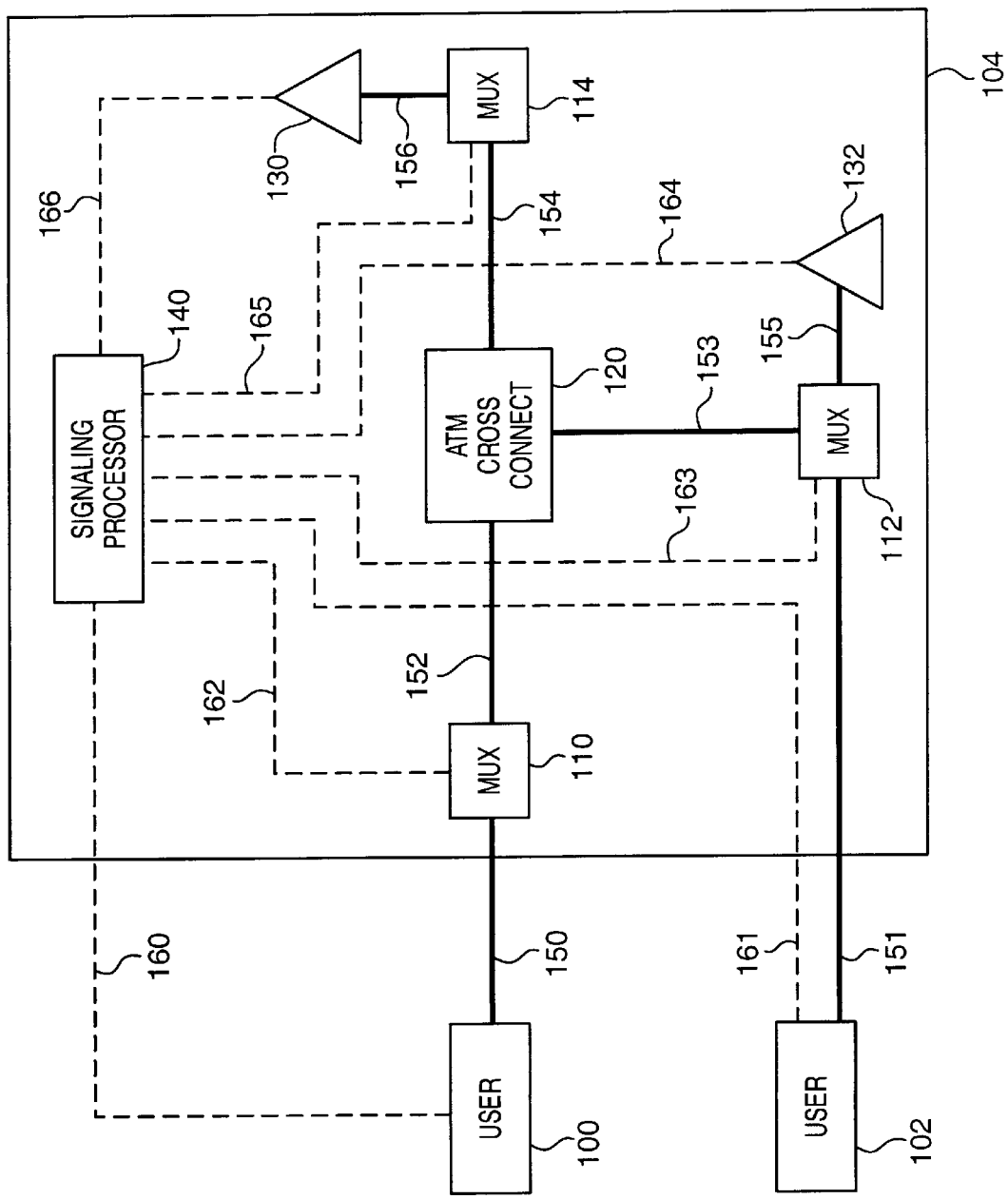
FIG. 1 is a block diagram for a version of the invention.

FIG. 1 depicts a version of the invention. The term "connection" refers to the transmission media used to carry user traffic and the term "link" refers to the transmission media used to carry signaling or control messages. On FIG. 1, connections are shown by solid lines and links are shown by dashed lines. Users 100 and 102 are connected to broadband system 104 by connections 150 and 151 respectively. Users 100 and 102 are linked to broadband system 104 by links 160 and 161 respectively. Users 100 and 102 could be any entity that supplies telecommunications traffic to broadband system 104 or that receives traffic from broadband system 104. Some examples would be a telecommunications switch or customer premises equipment (CPE). Connections 150 and 151 represent any connection that might be used by users 100 and 102 to access broadband system 104. Examples include: DS3, DS1, DS0, ISDN, E3, E1, E0, SDH, SONET, cellular, and PCS connections. Links 160 and 161 represent any signaling link that might be used between users 100 and 102 and broadband system 104. Examples include signaling system #7 (SS7), C7, ISDN, TCP/IP, and UDP/IP.

Broadband system 104 includes ATM interworking multiplexer (mux) 110, mux 112, mux 114, ATM cross-connect 120, narrowband switches 130 and 132, and signaling processor 140. Broadband system 104 also includes connections 152–156 and links 162–166. Cross-connect 120 is connected to mux 110, 112, and 114 by connections 152, 153, and 154 respectively. Mux 112 is connected to switch 132 by connection 155, and mux 114 is connected to switch 130 by connection 156. Mux 110 is connected to user 100 by connection 150, and mux 112 is connected to user 102 by connection 151. Connections 152–154 are ATM connections—preferably carried by SONET. Connections 155 and 156 are narrowband connections similar to connections 150 and 151. Preferably, connections 155 and 156 are DS3 or DS1 connections with embedded DS0s.

Signaling processor 140 is linked to mux 110 by link 162, to mux 112 by link 163, to switch 132 by link 164, to mux 114 by link 165, and to switch 130 by link 166. Signaling processor is linked to users 100 and 102 by links 160 and 161 respectively. One skilled in the art is aware that an STP might be used to exchange signaling instead of direct links. Links 160, 161, 164, and 166 are conventional signaling links with examples being SS7, ISDN, or C7. Links 162, 163, and 165 are any links that carry control messages, with examples being SS7 links, UDP/IP over ethernet, or a bus arrangement using a conventional bus protocol. Typically the switches and muxes are connected to a network management system that is not shown for purposes of clarity.

ATM cross-connect 120 is a conventional device that provides a plurality of ATM virtual connections between the muxes. Typically, the virtual connection would use DS1, DS3, or SONET for transport. The virtual connections are typically designated by the Virtual Path Identifier/Virtual Channel Identifier (VPI/VCI) in the cell headers. These VPI/VCIs are provisioned from mux to mux, but the cross-connect does not need to be controlled on a call-by-call basis. An example of the cross-connect is the NEC model 20. Those skilled in the art are aware that a multiple cross-connects could be used in this fashion, but for purposes of clarity, only a single cross-connect is shown. Either a single cross-connect or multiple cross-connects are referred to as a cross-connect system.

Muxes 110, 112, and 114 are operational to interwork (convert) traffic between ATM and non-ATM formats in response to control messages from signaling processor 140. Typically, this interworking entails interworking individual DS0s with individual VPI/VCIs in accord with messages from by signaling processor 140. A detailed description of the muxes is provided further below.

Narrowband switches 130 and 132 are conventional circuit switches. These switches process and interconnect calls. Typically, they connect an incoming DS0 to an outgoing DS0. Often, they perform numerous tasks including, validation, screening, routing, billing, and echo control. These switches can also be configured to provide special services. Examples of special services are: calling cards, class services, voice activated calling, and voice messaging, virtual private networking, hearing impaired assistance/ enhancement, operator services and intelligent network call routing local number portability, personal/terminal mobility, toll free calling)

Signaling processor 140 is operational to receive and process signaling to select a narrowband switch and connections to the selected switch. This switch selection can be based on various criteria. A few examples are: available access to the switch, current loading on the switch, the service capabilities of the switch, or the area served by the switch. Typically, the connections would be a VPI/VCI and a DS0. Signaling processor 140 is capable of providing control messages to the muxes to implement the connections. Signaling processor 140 is also capable of exchanging signaling with the switches to facilitate call processing. If required signaling processor 140 can also exchange signaling with the users to facilitate the call. A detailed description of signaling processor 140 follows further below.

In one embodiment, the invention operates as follows for a call from user 100 to user 102. In this embodiment, signaling processor 140 is transparent to the users and to the narrowband switches. The users and narrowband switches attempt to interact as they would in a typical network scenario. In the context of the invention, signaling is "intercepted" and processed by signaling processor 140. Connections are "intercepted" and extended by the muxes.

User 100 will seize a call connection on connection 150 to mux 110. Typically, this is a DS0 embedded within a DS3. User 100 will also forward a call set-up message to signaling processor 140. Typically, this is an SS7 Initial Address Message CAM). Signaling processor 140 will process the IAM in order to select a switch to process the call, it will select the connections to that switch. For example, if switch 130 is selected, an ATM connection pre-provisioned through cross-connect 154 from mux 110 to mux 114 over connections 152 and 154 would be selected. In addition, a connection to switch 130 would be selected within connection 156. For a standard call, a VPI/VCI and a DS0 would be selected by signaling processor 140.

Signaling processor 140 would send an IAM to switch 130 over link 166. The IAM would contain information used to process the call, such as the dialed number and the incoming DS0. Signaling processor would send a control message to mux 110 over link 162. The control message would instruct mux 110 to interwork the DS0 on connection 150 with the selected VPI/VCI on connection 152. Signaling processor would send a control message to mux 114 over link 165. The control message would instruct mux 114 to interwork the selected VPI/VCI on connection 154 with the selected DS0 connection 156. As a result, a call path from user 100 to switch 130 would be established through mux 110, cross-connect 120, and mux 114.

Switch 130 would process the call and select a route for the call. The switch would interconnect the incoming DS0 in connection 156 with another DS0 on connection 156. Switch 130 would also send an IAM indicating the destination for the call. In this example, the destination selected by switch 130 would be user 102. The IAM from switch 130 would be routed to signaling processor 140. Signaling processor 140 could read the destination point code in this IAM to determine the destination (user 102) selected by the switch for the call. Signaling processor 140 would select a VPI/VCI from mux 114 to the mux serving the destination—mux 112. Signaling processor 140 would also select a DS0 within connection 151 between mux 112 and user 102.

Signaling processor 140 would send a control message to mux 114 over link 165. The control message would instruct mux 114 to interwork the DS0 on connection 156 with the selected VPI/VCI on connection 154. Signaling processor 140 would send a control message to mux 112 over link 163. The control message would instruct mux 112 to interwork the selected VPI/VCI on connection 153 with the selected DS0 on connection 151. Signaling processor 140 might send a signaling message to user 102 to facilitate call completion.

As a result, a call path from switch 130 to user 102 would be established through mux 114, cross-connect 120, and mux 112. Combining the two call paths, a connection from user 100 to user 102 is established through broadband system 104. Advantageously, this is accomplished over broadband ATM connections, but without the need for an ATM switch or the call-by-call control of the ATM cross-connect. The muxes and the cross-connect provide ATM connections selected by the signaling processor on a call-by-call basis. The signaling processor makes these selections based on the call processing of the narrowband switch. The narrowband switch is also able to provide special features to the call.

Advantageously, only one narrowband switch was required within system 104. Because ATM broadband transport is available, the location of this switch is relatively independent. Any switch in system 104 could be used to process call. The ATM system provides the connection from the origination point to the switch, and from the switch to the destination point. This means narrowband switches can be selected based on load and availability. A narrowband switch could also be taken out of service simply by instructing the signaling processor to quit selecting it.

The Signaling Processor

The signaling processor would typically be separate from the muxes, but those skilled in the art appreciate that they could be housed together and coupled in a bus arrangement instead of being coupled by a data or signaling link. The signaling processor may support a single mux or a plurality of muxes. The signaling processor is comprised of hardware and software. Those skilled in the art are aware of various hardware components which can support the requirements of the invention. One example of such hardware is the FT-Sparc provided by Integrated Micro Products PLC. The FT-Sparc could use the Solaris operating system. Any data storage requirements could be met with conventional database software systems.

Figure 2:
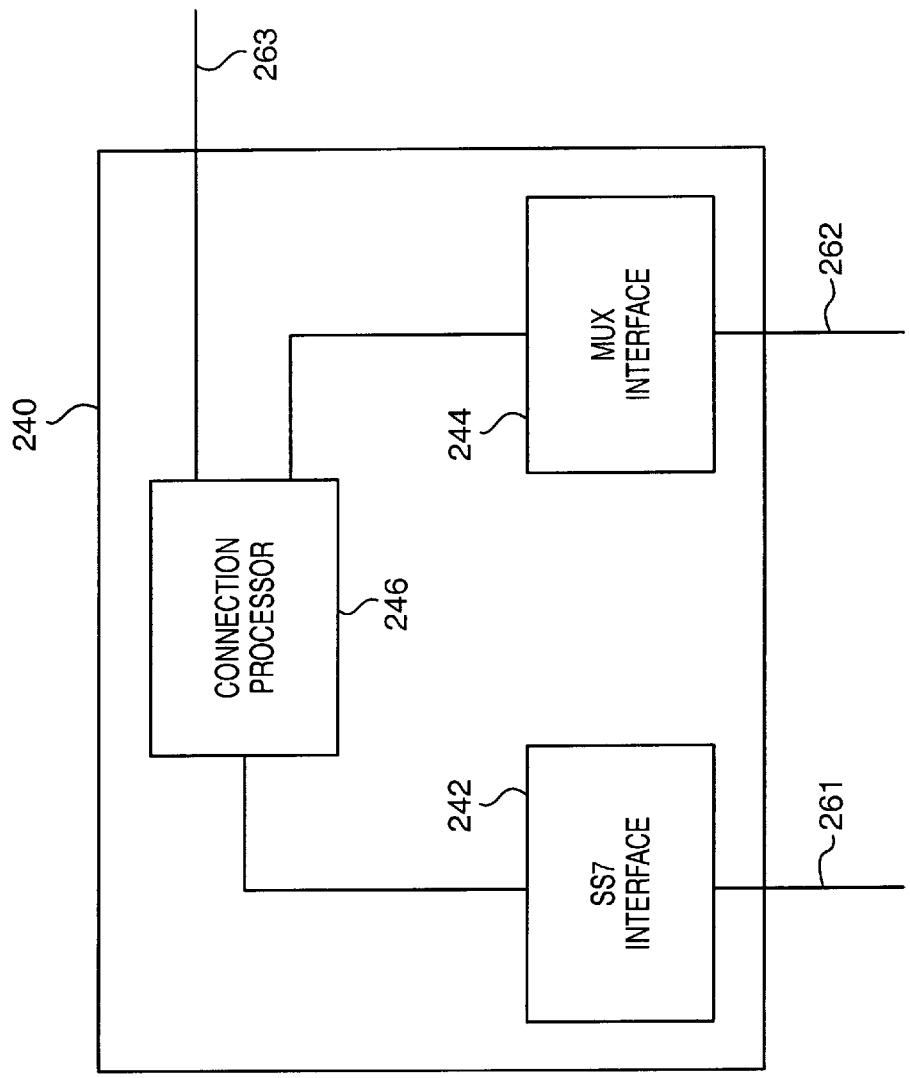
FIG. 2 is a logic diagram for a version of the invention.

FIG. 2 illustrates an example of the signaling processor, but any processor which supports the requirements stated for the invention would suffice. As shown in FIG. 2, signaling processor 240 includes functional blocks composed of SS7 interface 242, mux interface 244, and connection processor 246. These functional blocks have interrelations that are indicated and that are discussed below. SS7 interface 242 receives and transmits SS7 signaling over link 261. Mux interface 244 exchanges control messages with the muxes over link 263. Connection processor 246 exchanges network management information with network management systems over link 263.

SS7 interface 242 is operational to receive and transmit SS7 messages. SS7 interface 242 includes Message Transfer Part (MTP) functionality for MTP levels 1, 2 and 3. MTP 1 defines the physical and electrical requirements for a signaling link. MTP 2 sits on top of MTP 1 and maintains reliable transport over a signaling link by monitoring status and performing error checks. Together, MTP 1–2 provide reliable transport over an individual link. A device would need MTP 1–2 functionality for each link it uses. MTP 3 sits on top of MTP 2 and provides messages to the proper signaling link (actually to the MTP 2 for that link). MTP 3 directs messages to applications using MTP 1–2 for access to the signaling system. MTP 3 also has a management function which monitors the status of the signaling system and can take appropriate measures to restore service through the system. MTP levels 1–3 correspond to layers 1–3 of the open systems interconnection basic reference model (OSIBRF).

SS7 interface 242 also includes Integrated Services Digital Network User Part (ISUP) functionality. This might include ISUP timers that generate release message or re-transmit message where appropriate. If B-ISUP signaling is being used, SS7 interface 242 could also be equipped with B-ISUP capability. All of these elements are known in the art. SS7 interface 242 could be constructed using commercially available SS7 software interface tools. An example of such tools would be SS7 interface software provided by either Trillium, Inc., or by Dale, Gesek, McWilliams, and Sheridan, Inc.

SS7 interface 242 forwards IAM messages from link 261 to connection processor 246. SS7 interface 242 also receives IAMs from connection processor 246 and transmits them over link 261. SS7 interface 242 will receive subsequent SS7 call-related messages from link 261. SS7 interface 242 will alter the routing labels of these subsequent messages and re-transmit them over link 261. Examples of these subsequent messages include Address Complete Messages (ACM), Answer Messages (ANM), Release Messages (REL), and Release Complete Messages (RLC).

The routing label contains a Destination Point Code (DPC), an Originating Point Code (OPC), a Circuit Identification Code (CIC), and a Signaling Link Selection (SLS) code. The OPC and DPC identify the origin and intended destination for the signaling message. For example, a message sent from point A to point B would have an OPC of A and a DPC of B. A return message would reverse the two and have an OPC of B and DPC of A. The CIC identifies the originating circuit used on the call. The SLS is used to allow load sharing among the signaling links.

The following discussion refers to FIG. 1 and its associated embodiment. When subsequent call related messages are received by the SS7 interface of signaling processor 140, the OPC, DPC, and/or CIC may need to be altered. A message from originating user 100 to selected switch 130 would have its DPC and CIC altered to reflect the new DPC and CIC selected for the call by signaling processor 140. This is because switch 130 expects its own DPC and switch 130 also needs to know the actual DS0 used by mux 114 on connection 156. A message to originating user 100 from switch 130 would have its OPC altered to reflect the DPC in the original IAM from user 100. This is because user 100 expects response messages for the call from the point where the original IAM was sent. This point code is the DPC of the original IAM. The CIC is also altered to reflect the CIC in the original IAM from user 100. This is because user 100 expects the DS0 in the message to be the DS0 used in connection 150. Messages between terminating user 102 and selected switch 130 would need the CICs altered to reflect the actual DS0s used by the recipient of the message. The CIC in messages from user 102 to switch 130 would reflect the DS0 in connection 156. The CIC in messages from switch 130 to user 102 would reflect the DS0 in connection 151.

Referring back to FIG. 2, connection processor 246 is operational to process incoming IAMs and select connections. On calls into the network, connection processor 246 selects a narrowband switch to process the call and also selects the connections to this narrowband switch. These connections are typically VPI/VCI—DS0 combinations. If the call is extended beyond the selected narrowband switch, connection processor 246 identifies the required call destination in the IAM from the narrowband switch. Connection processor 246 also selects the connections to this destination. These connections are typically VPI/VCI—DS0 combinations.

As discussed above, the signaling processor can be transparent to the users. As a result, the users will send signaling to the narrowband switch selected by the user. The destination of this SS7 signaling message is identified by the Destination Point Code (DPC). Thus, on calls entering the network, the DPC indicates a narrowband switch selected by the user. Connection processor 246 typically uses this DPC to select a narrowband switch. This may be the same narrowband switch selected by the user or another narrowband switch. Connection processor 246 may then check the current usage of the selected switch. This might include the available trunk access to the switch and/or the processing load of the switch. If the access to the switch is congested or if the switch CPU is heavily loaded, then an alternate switch may be selected. In addition, special network operations may require the use of an alternate switch—for example, if a switch is inactive for maintenance or testing.

Once the switch is selected, connections to the switch are selected. The DS0 in the inbound connection is identified by the Circuit identification Code (CIC) in the IAM. A VPI/VCI is selected that has been previously provisioned through the cross-connect from the mux connected to the incoming DS0 to the mux serving the selected switch. A DS0 is selected from the latter mux to the selected switch. Based on the selections, IAM information is provided to SS7 interface 242, and control message information is provided to mux interface 244.

As discussed above, once the narrowband switch processes the call, it will send an IAM to the destination. Connection processor 246 will receive this IAM and use the DPC to identify the destination and select the appropriate connections to this destination. The CIC in the IAM identifies the DS0 from the selected switch to the mux. A VPI/VCI from that mux to a destination mux and a DS0 from the destination mux to the destination are selected. The selections are then implemented by the muxes in response to control messages from signaling processor 240. Connection processor 246 also tracks the usage and status of connections and connection groups for the connections under its span of control. It also receives network management information.

In some embodiments, connection processor 246 uses at least portions of the dialed number to select the narrowband switch. For example, narrowband switch "A" might be assigned to area code "X". On calls to area code "X", switch "A" is selected. If switch "A" is unavailable, alternate switch "B" could be used. This could also be carried out using the area code and exchange (NPA-NXX). In some embodiments, the dialed number may correspond to a special service offered by a select group of switches. For example, the number "1-800-NXX-XXXX" might correspond to a calling card service offered from only two switches. "888" and "900" numbers are also used in this fashion. Connection processor 246 could select one of these switches based on the dialed number. In some embodiments, the caller's number (commonly referred to as ANI), may be used in a similar fashion in order to select the switch to provide services to a caller. In some embodiments, the call could be routed to a switch based on the carrier identified in the signaling. This information is found in the carrier identification parameter in the IAM.

Mux interface 244 accepts information from connection processor 246 indicating the connections that are to be made or disconnected. Mux interface 244 accepts this information and provides corresponding control messages to the appropriate muxes. Mux interface 244 may also receive acknowledgments from the muxes. As a result, signaling processor 240 can provide ATM header information to the muxes for use in configuring the headers of ATM cells so that the cells are routed to the desired destination.

ATM Interworking Multiplexers

Figure 3:
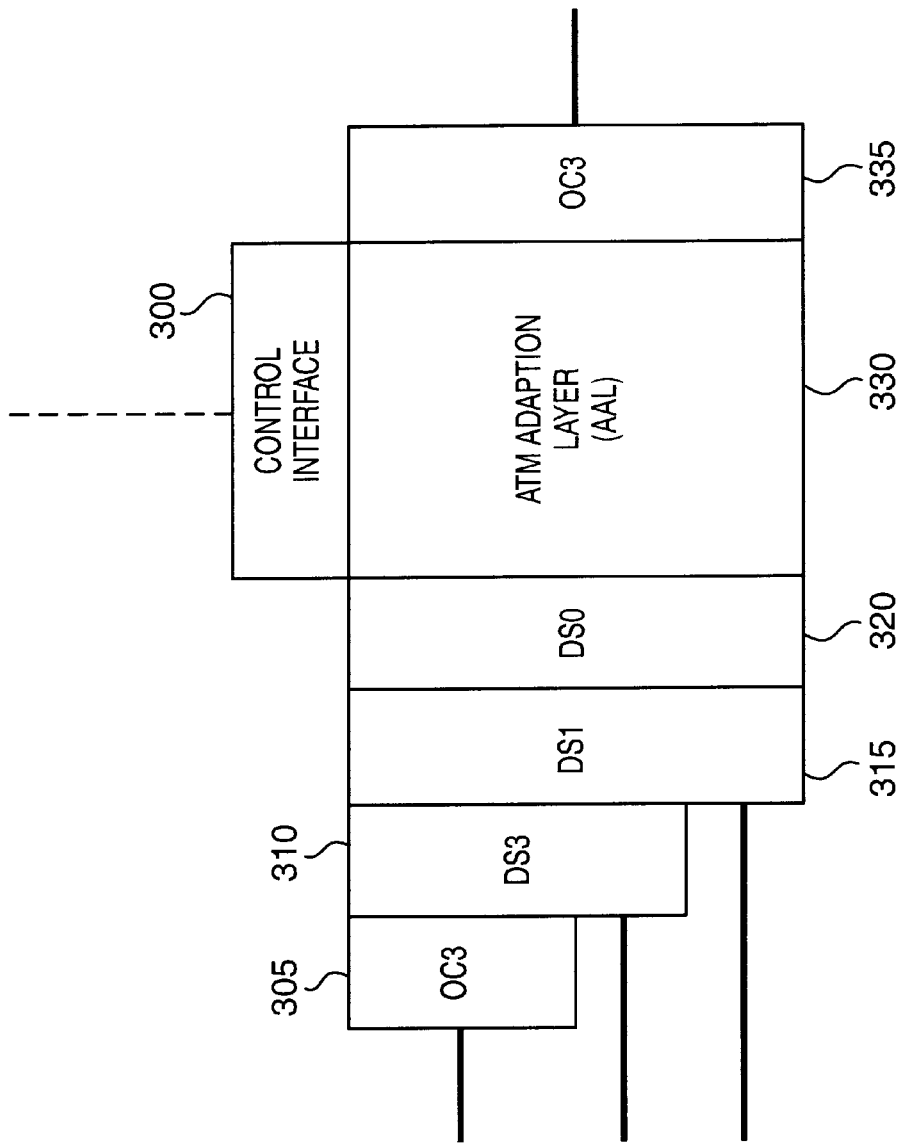
FIG. 3 is a block diagram for a version of the invention.

FIG. 3 shows one embodiment of the mux that is suitable for the present invention, but other muxes that support the requirements of the invention are also applicable. Shown are control interface 300, OC-3 interface 305, DS3 interface 310, DS1 interface 315, DS0 interface 320, ATM adaption Layer (AAL) 330, and OC-3 interface 335. Control interface 300 exchanges control messages with the signaling processor. Typically, these messages include DS0—VPI/VCI interworking assignments that are to be implemented by AAL 330. As such, this information is provided to AAL 330.

OC-3 interface 305 accepts the OC-3 format and makes the conversion to DS3. DS3 interface 310 accepts the DS3 format and makes the conversion to DS1. DS3 interface 310 can accept DS3s from OC-3 interface 305 or from an external connection. DS1 interface 315 accepts the DS1 format and makes the conversion to DS0. DS1 interface 315 can accept DS1s from DS3 interface 310 or from an external connection. DS0 interface 320 accepts the DS0 format and provides an interface to AAL 330. OC-3 interface 335 is operational to accept ATM cells from AAL 330 and transmit them to the cross-connect.

AAL 330 comprises both a convergence sublayer and a segmentation and reassembly (SAR) layer. AAL 330 is operational to accept the user information in DS0 format from DS0 interface 320 and convert the information into ATM cells. AALs are known in the art and information about AALs is provided by International Telecommunications Union (ITU) document I.363. An AAL for voice is also described in patent application Ser. No. 08/395,745, filed on Feb. 28, 1995, entitled "Cell Processing for Voice Transmission", now U.S. Pat. No. 5,606,553 and hereby incorporated by reference into this application. AAL 330 obtains the virtual path identifier (VPI) and virtual channel identifier (VCI) for each call from control interface 300. AAL 330 also obtains the identity of the DS0 for each call (or the DS0s for an N×64 call). AAL 330 then converts user information between the identified DS0 and the identified ATM virtual connection. Acknowledgments that the assignments have been implemented may be sent back to the signaling processor if desired. Calls with a bit rate that are a multiple of 64 kbit/second are known as N×64 calls. If desired, AAL 330 can be capable of accepting control messages through control interface 300 for N×64 calls.

As discussed above, the mux also handles calls in the opposite direction—from OC-3 interface 335 to DS0 interface 320. This traffic would have been converted to ATM by another mux and routed to OC-3 335 by the cross-connect over the selected VPI/VCI. Control interface 300 will provide AAL 330 with the assignment of the selected VPI/VCI to the selected outbound DS0. The mux will convert the ATM cells with the selected VPI/VCI in the cell headers into the DS0 format and provide it to the selected outbound DS0 connection. A technique for processing VPI/VCIs is disclosed in patent application Ser. No. 08/653,852, filed on May 28, 1996, entitled "Telecommunications System with a Connection Processing System", and hereby incorporated by reference into this application.

DS0 connections are bi-directional and ATM connections are typically uni-directional. As a result, two virtual connections in opposing directions will typically be required for each DS0. As discussed, this can be accomplished provisioning the cross-connect with companion VPI/VCIs in the opposite direction as the original VPI/VCIs. On each call, the muxes would be configured to automatically invoke the particular companion VPI/VCI to provide a bi-directional virtual connection to match the bidirectional DS0 on the call.

With an understanding of the preferred embodiment, those skilled in the art will appreciate that the present invention allows the integration of high speed broadband transport with systems configured for narrowband process and control. By performing call handling functions in narrowband switches, the broadband transport capability is transparent to the users and to other existing network components configured to interact with narrowband switches. Moreover, the broadband transport is accomplished economically and efficiently without the need for broadband switches.

Those skilled in the art will appreciate that variations from the specific embodiments disclosed above are contemplated by the invention. The invention should not be restricted to the above embodiments, but should be measured by the following claims.

We claim:

1. A telecommunications system for providing a service for a call, wherein the telecommunications system comprises;

a signaling processor that is operational to receive and process a first telecommunications signaling message for the call and to provide a first control message, a second control message, and a second telecommunications signaling message for the call;

a first ATM interworking multiplexer that is linked to the signaling processor and that is operational to receive narrowband traffic for the call over a first narrowband connection, to convert the narrowband traffic from the first narrowband connection into ATM cells that identify a first virtual connection based on the first control message, and to transmit the ATM cells over the first virtual connection;

an ATM cross-connect system that is connected to the first ATM interworking multiplexer and that is operational to receive the ATM cells from the first ATM interworking multiplexer over the first virtual connection and to route the ATM cells from the first virtual connection based on the first virtual connection identified in the ATM cells;

a second ATM interworking multiplexer that is connected to the ATM cross-connect system and linked to the signaling processor, and that is operational to receive the ATM cells from the ATM cross-connect system over the first virtual connection, to convert the ATM cells from the first virtual connection into the narrowband traffic, and to transmit the narrowband traffic over a second narrowband connection based on the second control message; and a narrowband switch that is connected to the second ATM multiplexer and linked to the signaling processor, and that is operational to receive the narrowband traffic from the second ATM multiplexer over the second narrowband connection and to apply a service to the call based on the second telecommunications signaling message.

2. The system of claim 1 wherein the signaling processor is operational to select the narrowband switch.

3. The system of claim 2 wherein the signaling processor is operational to select the first virtual connection based on the selected narrowband switch.

4. The system of claim 1 wherein the signaling processor is operational to select the narrowband switch based on a destination point code in the first telecommunications signaling message.

5. The system of claim 1 wherein the signaling processor is operational to select the narrowband switch based on an origination point code and a destination point code in the first telecommunications signaling message.

6. The system of claim 1 wherein the signaling processor is operational to select the narrowband switch based on available access to the narrowband switch.

7. The system of claim 1 wherein the signaling processor is operational to select the narrowband switch based on loading on the narrowband switch.

8. The system of claim 1 wherein the signaling processor is operational to select the narrowband switch based on an area served by the narrowband switch.

9. The system of claim 1 wherein the signaling processor is operational to select the narrowband switch based on an NPA in the first telecommunications signaling message.

10. The system of claim 1 wherein the signaling processor is operational to select the narrowband switch based on an NPA-NXX in the first telecommunications signaling message.

11. The system of claim 1 wherein the signaling processor is operational to select the narrowband switch based on a caller's number in the first telecommunications signaling message.

12. The system of claim 1 wherein the signaling processor is operational to select the narrowband switch based on one of an "800", "888", and "900" number in the first telecommunications signaling message.

13. The system of claim 1 wherein the signaling processor is operational to select the narrowband switch based on a network identified in the first telecommunications signaling message.

14. The system of claim 1 wherein the signaling processor is operational to select the narrowband switch based on network maintenance conditions.

15. The system of claim 1 wherein the signaling processor is operational to select the first virtual connection based and the second narrowband connection based on the first telecommunications signaling message.

16. The system of claim 1 wherein the first telecommunications signaling message is a call set-up message.

17. The system of claim 1 wherein the first telecommunications signaling message is a Signaling System #7 Initial Address Message (SS7 IAM).

18. The system of claim 1 wherein the signaling processor is operational to select the first virtual connection based on available access to the narrowband switch.

19. The system of claim 1 wherein the signaling processor is operational to select the first virtual connection based on loading on the narrowband switch.

20. The system of claim 1 wherein the signaling processor is operational to select the first virtual connection based on an area served by the narrowband switch.

21. The system of claim 1 wherein the signaling processor is operational to select the first virtual connection based on an NPA in the first telecommunications signaling message.

22. The system of claim 1 wherein the signaling processor is operational to select the first virtual connection based on an NPA-NXX in the first telecommunications signaling message.

23. The system of claim 1 wherein the signaling processor is operational to select the first virtual connection based on a caller's number in the first telecommunications signaling message.

24. The system of claim 1 wherein the signaling processor is operational to select the first virtual connection based on one of an "800", "888", and "900" number in the first telecommunications signaling message.

25. The system of claim 1 wherein the signaling processor is operational to select the first virtual connection based on a network identified in the first telecommunications signaling message.

26. The system of claim 1 wherein the signaling processor is operational to select the first virtual connection based on network maintenance conditions.

27. The system of claim 1 wherein the first virtual connection is designated by a Virtual Path Identifier/Virtual Channel Identifier (VPI/VCI).

28. The system of claim 1 wherein the first virtual connection has been pre-provisioned through the ATM cross-connect system.

29. The system of claim 1 wherein the first control message identifies the first narrowband connection and the first virtual connection, and wherein the second control message identifies the first virtual connection and the second narrowband connection.

30. The system of claim 1 wherein the second telecommunications signaling message is an Initial Address Message.

31. The system of claim 1 wherein the first and second narrowband connections are DS0 connections.

32. The system of claim 1 wherein the service provided by the narrowband switch is routing the call.

33. The system of claim 1 wherein the service provided by the narrowband switch is billing the call.

34. The system of claim 1 wherein the service provided by the narrowband switch is validating the call.

35. The system of claim 1 wherein the service provided by the narrowband switch is a calling card service.

36. The system of claim 1 wherein the service provided by the narrowband switch is a voice messaging service.

37. The telecommunications system of claim 1 wherein:

the narrowband switch is further operational to process the call based on the second telecommunications signaling message, to provide a third telecommunications signaling message based on the call processing, and to route the narrowband traffic for the call to the second ATM multiplexer over a third narrowband connection;

the signaling processor is further operational receive and process the third telecommunications signaling message to provide a third control message to the second ATM multiplexer, and to provide a fourth control message;

the second ATM interworking multiplexer is further operational to receive the narrowband traffic for the call from the narrowband switch over the third narrowband connection, to convert the narrowband traffic from the third narrowband connection into ATM cells that identify a second virtual connection based on the third control message, and to transmit the ATM cells over the second narrowband connection;

the ATM cross-connect system is further operational to receive the ATM cells from the second ATM interworking multiplexer over the second virtual connection and to route the ATM cells from the second virtual connection based on the second virtual connection identified in the ATM cells; and a third ATM interworking multiplexer connected to the ATM cross-connect system and linked to the signaling processor and that is operational to receive the ATM cells from the ATM cross-connect system over the second virtual connection, to convert the ATM cells from the second virtual connection into the narrowband traffic, and to transmit the narrowband traffic over a fourth narrowband connection based on the fourth control message.

38. The system of claim 37 wherein the signaling processor is operational to select the second virtual connection based on a destination point code in the third telecommunications signaling message.

39. The system of claim 37 wherein the signaling processor is operational to select the second virtual connection based on a destination network identified in the third telecommunications signaling message.

40. A method for operating a telecommunications system for providing a service for a call, wherein the method comprises;

receiving narrowband traffic for the call into a first ATM interworking multiplexer from a first narrowband connection;

receiving a first telecommunications signaling message for the call into a signaling processor;

in the signaling processor, processing the first telecommunications signaling message to provide a first control message to the first ATM interworking multiplexer wherein the first control message identifies the first narrowband connection and a first ATM connection, and to provide a second control message to a second ATM interworking multiplexer wherein the second control message identifies the first ATM connection and a second narrowband connection;

in the first ATM multiplexer, converting the narrowband traffic from the first narrowband connection into ATM cells that identify the first ATM connection based on the first control message;

transmitting the ATM cells from the first ATM interworking multiplexer to an ATM cross-connect system;

in the ATM cross-connect system, routing the ATM cells from the first ATM connection to the second ATM interworking multiplexer based on the first ATM connection that is identified in the ATM cells;

receiving the ATM cells into the second ATM interworking multiplexer from the ATM cross-connect system over the first ATM connection;

in the second ATM interworking multiplexer, converting the ATM cells into the narrowband traffic;

transmitting the narrowband traffic from the second ATM interworking multiplexer over the second narrowband connection based on the second control message;

receiving the narrowband traffic for the call from the second ATM interworking multiplexer over the second narrowband connection into a narrowband switch; and providing a service for the call in the narrowband switch.

41. The method of claim 40 wherein the signaling processor selects the narrowband switch.

42. The method of claim 41 wherein the signaling processor selects the first ATM connection based on the selected narrowband switch.

43. The method of claim 40 wherein the signaling processor selects the narrowband switch based on a destination point code in the first telecommunications signaling message.

44. The method of claim 40 wherein the signaling processor selects the narrowband switch based on an origination point code and a destination point code in the first telecommunications signaling message.

45. The method of claim 40 wherein the signaling processor selects the narrowband switch based on available access to the narrowband switch.

46. The method of claim 40 wherein the signaling processor selects the narrowband switch based on loading on the narrowband switch.

47. The method of claim 40 wherein the signaling processor selects the narrowband switch based on an area served by the narrowband switch.

48. The method of claim 40 wherein the signaling processor is selects the narrowband switch based on an NPA in the first telecommunications signaling message.

49. The method of claim 40 wherein the signaling processor selects the narrowband switch based on an NPA-NXX in the first telecommunications signaling message.

50. The method of claim 40 wherein the signaling processor selects the narrowband switch based on a caller's number in the first telecommunications signaling message.

51. The method of claim 40 wherein the signaling processor selects the narrowband switch based on one of an "800", "888", and "900" number in the first telecommunications signaling message.

52. The method of claim 40 wherein the signaling processor selects the narrowband switch based on a network identified in the first telecommunications signaling message.

53. The method of claim 40 wherein the signaling processor selects the narrowband switch based on network maintenance conditions.

54. The method of claim 40 wherein the signaling processor selects the first ATM connection based and the second narrowband connection based on the first telecommunications signaling message.

55. The method of claim 40 wherein the first telecommunications signaling message is a call set-up message.

56. The method of claim 40 wherein the first telecommunications signaling message is a Signaling Method #7 Initial Address Message (SS7 IAM).

57. The method of claim 40 wherein the signaling processor selects the first ATM connection based on available access to the narrowband switch.

58. The method of claim 40 wherein the signaling processor selects the first ATM connection based on loading on the narrowband switch.

59. The method of claim 40 wherein the signaling processor selects the first ATM connection based on an area served by the narrowband switch.

60. The method of claim 40 wherein the signaling processor selects the first ATM connection based on an NPA in the first telecommunications signaling message.

61. The method of claim 40 wherein the signaling processor selects the first ATM connection based on an NPA-NXX in the first telecommunications signaling message.

62. The method of claim 40 wherein the signaling processor selects the first ATM connection based on a caller's number in the first telecommunications signaling message.

63. The method of claim 40 wherein the signaling processor selects the first ATM connection based on one of an "800", "888", and "900" number in the first telecommunications signaling message.

64. The method of claim 40 wherein the signaling processor selects the first ATM connection based on a network identified in the first telecommunications signaling message.

65. The method of claim 40 wherein the signaling processor selects the first ATM connection based on network maintenance conditions.

66. The method of claim 40 wherein the first ATM connection is designated by a ATM Path Identifier/ATM Channel Identifier (VPI/VCI).

67. The method of claim 40 wherein the first ATM connection has been pre-provisioned through the ATM cross-connect system.

68. The method of claim 40 wherein the first control message identifies the first narrowband connection and the first ATM connection, and wherein the second control message identifies the first ATM connection and the second narrowband connection.

69. The method of claim 40 wherein the second telecommunications signaling message is an Initial Address Message.

70. The method of claim 40 wherein the first and second narrowband connections are DS0 connections.

71. The method of claim 40 wherein the service provided by the narrowband switch is routing the call.

72. The method of claim 40 wherein the service provided by the narrowband switch is billing the call.

73. The method of claim 40 wherein the service provided by the narrowband switch is validating the call.

74. The method of claim 40 wherein the service provided by the narrowband switch is a calling card service.

75. The method of claim 40 wherein the service provided by the narrowband switch is a voice messaging service.

76. The telecommunications method of claim 40 further comprising:

processing the call in the narrowband switch based on the second telecommunications signaling message providing a third telecommunications signaling message from the narrowband switch based on the call processing;

routing the narrowband traffic for the call from the narrowband switch to the second ATM interworking multiplexer over a third narrowband connection;

processing the third telecommunications signaling message in the signaling processor to provide a third control message to the second ATM interworking multiplexer, and to provide a fourth control message;

receiving the narrowband traffic for the call from the narrowband switch over the third narrowband connection into the second ATM interworking multiplexer;

in the second ATM interworking multiplexer, converting the narrowband traffic from the third narrowband connection into ATM cells that identify a second ATM connection based on the third control message;

transmitting the ATM cells from the second ATM interworking multiplexer over the second ATM connection to the ATM cross-connect system;

receiving the ATM cells from the second ATM interworking multiplexer over the second ATM connection into the ATM cross-connect system;

in the ATM cross-connect system, routing the ATM cells from the second ATM connection to the third ATM interworking multiplexer based on the second ATM connection identified in the ATM cells;

receiving the ATM cells from the ATM cross-connect system over the second ATM connection into a third ATM interworking multiplexer;

in the third ATM interworking multiplexer, converting the ATM cells from the second ATM connection into the narrowband traffic; and transmitting the narrowband traffic from the third ATM interworking multiplexer over a fourth narrowband connection based on the fourth control message.

77. The method of claim 76 wherein the signaling processor selects the second ATM connection based on a destination point code in the third telecommunications signaling message.

78. The method of claim 76 wherein the signaling processor selects the second ATM connection based on a destination network identified in the third telecommunications signaling message.

* * * * *